United States Patent
Pawar et al.

(10) Patent No.: US 7,624,120 B2
(45) Date of Patent: Nov. 24, 2009

(54) SYSTEM AND METHOD FOR SWITCHING A DATA PARTITION

(75) Inventors: Deepak Pawar, Redmond, WA (US); Wey Y. Guy, Redmond, WA (US); Lubor J. Kollar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 264 days.

(21) Appl. No.: 10/880,271

(22) Filed: Jun. 29, 2004

(65) Prior Publication Data

US 2005/0187897 A1   Aug. 25, 2005

Related U.S. Application Data

(60) Provisional application No. 60/543,526, filed on Feb. 11, 2004.

(51) Int. Cl.
*G06F 7/00* (2006.01)
(52) U.S. Cl. .................. 707/102; 707/100; 707/200
(58) Field of Classification Search ............... None
See application file for complete search history.

(56) References Cited

U.S. PATENT DOCUMENTS

| | | | | |
|---|---|---|---|---|
| 5,625,815 A * | 4/1997 | Maier et al. | ............... | 707/8 |
| 5,806,065 A * | 9/1998 | Lomet | ............... | 707/8 |
| 6,029,168 A * | 2/2000 | Frey | ............... | 707/10 |
| 6,058,401 A * | 5/2000 | Stamos et al. | ............... | 707/201 |
| 6,219,675 B1 * | 4/2001 | Pal et al. | ............... | 707/201 |
| 6,353,821 B1 * | 3/2002 | Gray | ............... | 707/2 |
| 7,043,491 B1 * | 5/2006 | Gong | ............... | 707/101 |
| 7,334,002 B2 * | 2/2008 | Byrne | ............... | 707/202 |
| 7,464,100 B2 * | 12/2008 | Schreter | ............... | 707/101 |
| 2001/0047360 A1 * | 11/2001 | Huras et al. | ............... | 707/102 |
| 2003/0149702 A1 * | 8/2003 | Saffer et al. | ............... | 707/102 |

OTHER PUBLICATIONS

Wiebe, Edward. http://climate.uvic.ca/people/stone/cmg_idl_lib/swap.pro (Web archived date Sep. 4, 2003).*
Brunstrom, A. et al., "Experimental Evaluation of Dynamic Data Allocation Strategies in a Distributed Database with Changing Workloads", *Conference on Information and Knowledge Management, Proceedings of the 4th International Conference on Information and Knowledge Management*, 1995, 395-402.
Hernandez, M.A. et al., "The Merge/Purge Problem for Large Databases", *International Conference on Management of Data and Symposium on Principles of Database Systems, Proceedings of the 1995 ACM SIGMOD International Conference on Management of Data*, 1995, 127-138.

* cited by examiner

*Primary Examiner*—Neveen Abel Jalil
*Assistant Examiner*—Christyann R Pulliam
(74) *Attorney, Agent, or Firm*—Woodcock Washburn LLP (57) ABSTRACT

A method of mapping data into a table includes identifying pointers of a source portion and target portion and switching the metadata pointers of the target portion to be those of the source portion. Upon switching the metadata pointers, the data of the source portion is mapped into the target portion of the table. The method of mapping exhibits the advantage of performing the mapping operation by moving metadata and not table content data. The method may be used on any portion of a database including files, tables, partitions, and indexes. In one embodiment, the switching of pointers includes copying the target portion metadata into temporary storage, copying source portion metadata into the target portion metadata, and copying metadata from the temporary storage into the source portion metadata.

4 Claims, 6 Drawing Sheets

SYSTEM AND METHOD FOR SWITCHING A DATA PARTITION

CROSS-REFERENCE TO RELATED APPLICATIONS

This application claims benefit under 35 U.S.C. § 119(e) of provisional U.S. Pat. Ser. No. 60/543,526, filed Feb. 11, 2004, entitled "System and Method for Switching a Data Partition" the disclosure of which is incorporated herein by reference.

FIELD OF THE INVENTION

This invention relates in general to the field of computer databases. More particularly, this invention relates to the use of partitions in a database structure.

BACKGROUND OF THE INVENTION

Some databases can be viewed as being one or more tables. Typically, the table has one or more indexes to assist the user in finding information stored in the database. For example, if the database is a phone book, the main table may include a name, address, telephone number, and other useful contact information. One possible index on that table may be to reference names such that looking up a name may lead to a telephone number. Other possible indexes such as an index on the address or on the phone number itself, or other information are easily generated. Updates, such as a new telephone subscriber, are often entered into the database. However, the addition may take a significant amount of time based on the processing required to make a row or tuple level entry and consequently update the multiple indexes. The database itself may be partitioned according to some method, such as alphabetically, to produce multiple linked tables. Each of these tables have indexes and pages associated with each partition. An update to the data content of the database, or any row or column level operation, may require the update of the table, the associated indexes, and the pages as well. The update may well have a collateral ripple effect such that a relatively small change on the large database may take a long time to execute. The intensive processing effort it takes for extensive changes or other updates to the databases is undesirable because the processing effort may limit the availability of the database to other users.

One common problem with some databases is the update problem of discarding old data and the introduction of new data. Consider the case of a utility company that has a need to keep a rolling 90 day record of billing for its customers. In this case at the end of every month, the new billing charges should appear as recent charges and the oldest month of billing charges should be dropped or archived. This need for a "sliding window" of billing data involves two time intensive updates where the database becomes unavailable for a length of time needed to add a new billing period and drop or archive an old period. Such changes are not insignificant as the database is changed for every customer the utility services. The time period to perform this change may increasing grow as the utility grows in subscription. Additionally, the table may be unavailable during this period of changes. As the time for execution of a rolling change increases, so does the unavailability of the data.

Thus, there is a need for a technique that can allow for an improvement in speed and a reduction in unavailability with respect to the administration of changes to a database. The present invention addresses the aforementioned needs and solves them with additional advantages as expressed herein.

SUMMARY OF THE INVENTION

The subject invention realizes a system and method of mapping data into a table with the advantage of moving metadata but not requiring data content movement. In one embodiment, the method includes identifying metadata pointers of a source portion and target portion and switching the metadata pointers of the target portion to be those of the source portion. The target portion is part of the table and the source portion optionally is part of the table or more typically, not part of the same table. Upon switching the metadata pointers, the data of the source portion is mapped to the target portion of the database. The target and source portions of the table can be either populated or blank to accommodate swapping in or swapping out data portions for the table. In one embodiment, the switching of pointers can typically copy the target portion metadata into temporary storage, copy the source portion metadata into the target portion metadata, and copy metadata from the temporary storage into the source portion metadata.

In one embodiment of the invention, a method of changing a portion of a table includes separating a portion of the table such that the separated portion may be accessed off-line from the database, making changes to the separated portion to generate a changed portion and then switching the changed portion back to the table by asserting metadata pointers for mapping the changed portion back to the table. According to an aspect of the invention, no data is required to be moved as the changed portion is rejoined with the table. A further aspect of the invention involves optionally performing a compatibility test before the switching operation as well as optionally locking the source and target portions before performing the switching and unlocking the portions after the switching.

BRIEF DESCRIPTION OF THE DRAWINGS

The foregoing summary, as well as the following detailed description of various embodiments, is better understood when read in conjunction with the appended drawings. For the purpose of illustrating embodiments of the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

The subject invention provides for switching metadata for a partition that facilitates an ability to speed up loading and removal of tuples or rows from tables. One resulting benefit of the invention is the ability to temporarily move a partition of a table "outside" of a database, perform desired operations, such as maintenance, and then re-join the partitioned table back with the database. In accordance with aspects of the invention, users of partitioned tables can introduce new data and remove old data from a range of partitioned tables very efficiently by switching a populated partition between two tables. No data is moved in this process because the switching occurs at the metadata level and not the data level. This makes the operation both scalable and fast.

According to an aspect of the invention, the switching of a partition can assist loading data into a new partition of an existing partitioned table with minimal disruption in data access in the remaining partitions, loading data into a new partition of an existing partitioned table with performance equal to loading the same data into a new empty table, deleting one or more portions of a partitioned table and minimally impacting access to the rest of the table, backing up a partition as a separate table and performing various maintenance operations on a per partition basis.

In one embodiment, a new table, or portion of a table, and related indexes may be constructed off line while the original, or main part of the database is being used on-line. When the new table and indexes is to be added to the main database, table and index pointers are switched in metadata and the resulting database can now access the new table and index data. In another embodiment, the new table may be a blank set of data which allows switching out an old table and indexes. Under the scenario where the combination of adding a new set of data and switching in a blank set of data occurs, it is an aspect of the invention that the operation of the invention does not actually move data, but only moves metadata, and a "sliding window" can be achieved. However, each switch, either the addition of new data or the switching in of blank data may be performed separately according to the need of the database. It should be noted that the added or deleted portion of a table, as well as the main table, may be either a partitioned or non-partitioned table; the invention is scalable to accommodate both.

Some benefits of creating a new table portion off line from the main table is that it is generally easier to build a new table portion first off line than it is to slowly update an existing table. One advantage is that one can pre-sort data before building the new portion and that is more time efficient to build a new portion first and add the new portion to the main database using aspects of the invention. Additionally, the build need not affect the availability of the main table. Additionally, a rollback mechanism need not be employed when updating a table. Rollback mechanisms can be expensive in terms of memory use. However, using aspects of the invention, rollback memory may be saved and used for another purpose.

Exemplary Embodiments of the Invention

Figure 1:
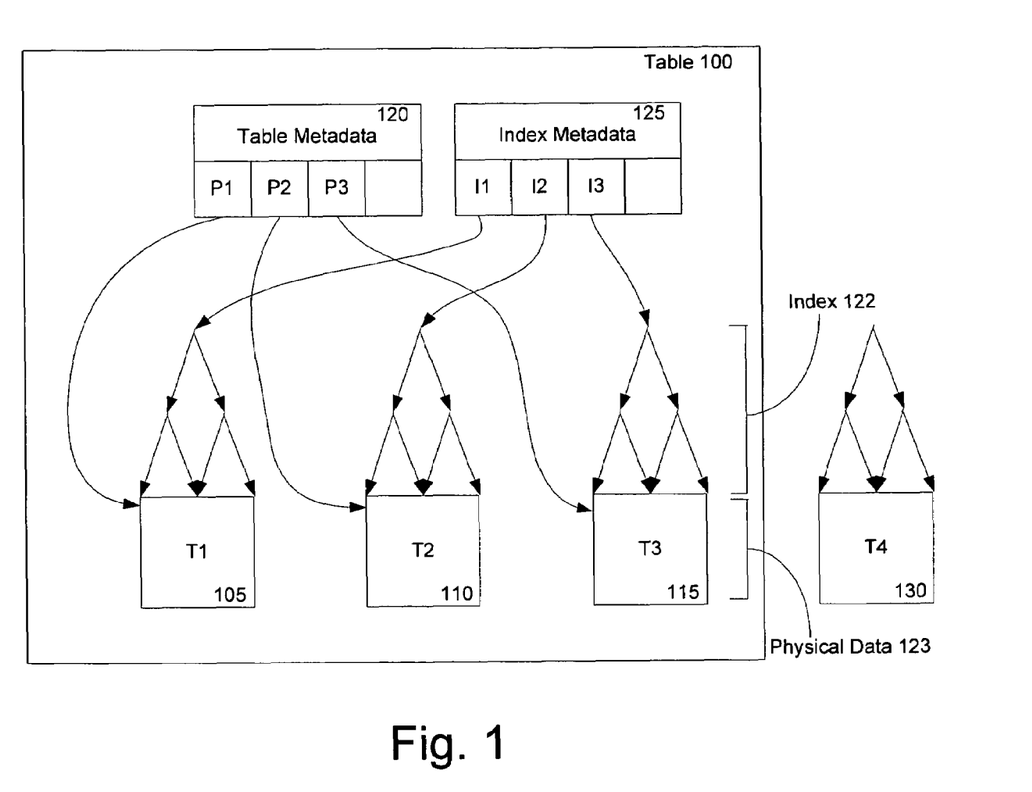
FIG. 1 is a diagram depicting a metadata aspect of the present invention.

FIG. 1 depicts a table 100 partitioned into three exemplary table partitions, T1, T2 and T3 105, 110, and 115 respectively. As a general matter, table partitions are database objects that may contain all data 123 in a table. A table may be defined as a collection of columns. In a table, data is organized in a row-and-column format similar to a spreadsheet. Each row represents a unique record, and each column represents a field within the record. Tables may have one or more associated indexes 122. An index in a database enables quick search for a specific information in the table. An index may contain keys built from one or more columns in the table or view and pointers that map to the physical storage location 123 of the specified data. The performance of database queries and applications can be significantly improved by creating well-designed indexes because they can eliminate the need to perform table scans.

Data structures, such as tables and indexes may have associated metadata that concerns the respective data structure. For example table metadata 120 may contain, among other things, pointers P1, P2, P3 for physical addresses of table partitions T1, T2, and T3 respectively. Likewise, metadata may exist for indexes on the tables. For example, index metadata 125 can include pointers for the indexes I1, I2 and I3 of tables T1, T2, and T3 respectively.

According to an aspect of the invention, a switch partition can be defined as an operation by which data blocks can be virtually moved quickly and efficiently from a partition of one table to a partition of another table. In prior art technology, the actual data insertion from one partition into another may take minutes and even hours depending upon the size of the data in the partition. But with the switch partition aspect of the present invention, the whole operation of moving data from one table partition into another just takes in the order of seconds and this time is not dependent on the size of the data contained in the partition being moved. This is made possible because while switching partition the actual data is not touched but only the metadata of the partition containing the data is changed.

As implied in FIG. 1, each data object or structure within the table 100 has a description of the object in some form of metadata. Each of the objects in database like tables and indexes are represented by their metadata which is the information about these objects. Typical information stored in metadata for the table 120 or in metadata for an index 125 would be the information about columns, key columns of the index, columns on which the table or the index is partitioned and also physical pointers to the physical location 123 of the data of the table. According to an aspect of the invention, switching the partitions involves switching the actual physical pointers to these partitions as stored in metadata 120, 125. This operation is very fast as no actual data is moved from one physical location to another, yet after the switch is completed, the switched partitions would behave as if it is part of the new table.

If it is desired to add a new table partition to an existing table or a table to the database then the new partition or table may be generated off line and added via an aspect of the present invention. If it also desirable to archive a partition of a table, and simultaneously add a new table partition, an aspect of the present invention can accommodate these two activities. For example, a new table T4 (130) may be added to table 100, to accommodate a new month's worth of database records and an oldest month T1 (105) may be rolled out of the table and subsequently from the database for archival purposes. As shown in FIG. 1, the new table T4 (130) may be constructed off-line from the database 100 where table partitions T1, T2, and T3 are accessible to users. Note that metadata pointers for the table 120 and the index 125 point at the active table partitions T1, T2 and T3 in the database 100. An aspect of the present invention allows swapping the pointers of table partitions T1 (105) and T4 (130) with the result shown in FIG. 2.

Figure 2:
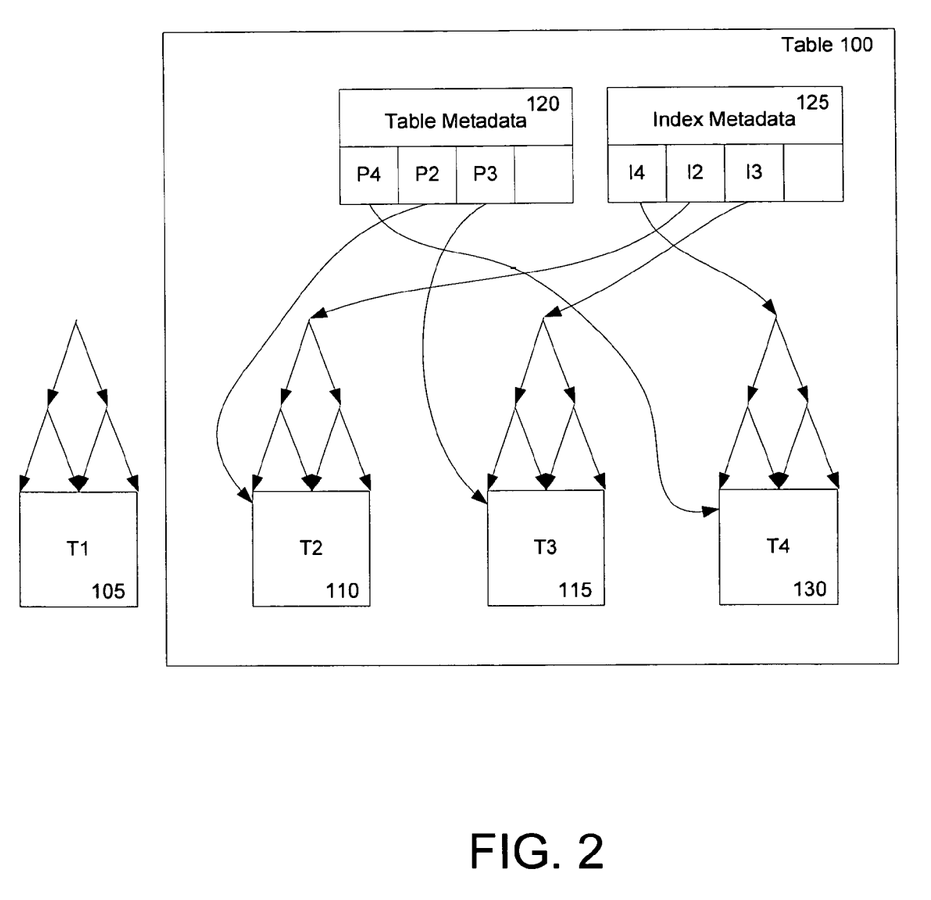
FIG. 2 is a diagram depicting a switching aspect of the present invention.

FIG. 2 depicts the data contents of the table 100 after the partitions T1 (105) and T4 (130) are switched according to an aspect of the invention. The metadata pointer 120 now contains the switched metadata of the pointers for table partitions T2, T3, and T4 instead of for the table partitions of T1, T2, and T3 as shown in FIG. 1. Similarly, the metadata pointers for the table indexes 125 are also switched to be index partitions I2, I3 and I4 which includes the index to the new table partition T4. The table partition T1 (105), once a part of table 100 is now external to the table and may be archived. As an aspect of the invention, no data was required to move in the introduction of table partition T4 into table 100. Only metadata need be changed to accommodate the change in table access to the metadata.

It should be noted that the example of FIGS. 1 and 2 may be implemented such that T1 (105) and T4(130) may be a table or any table partition. Either or both tables T1 and T4 may be populated with data or blank. Thus, the present invention can be used for introducing new data into a table, separating a portion of a table and a database for maintenance or archival purposes, or simultaneous swapping in and out of two partitions in a table. Partitions can also be mapped into other distinct tables.

Figure 3:
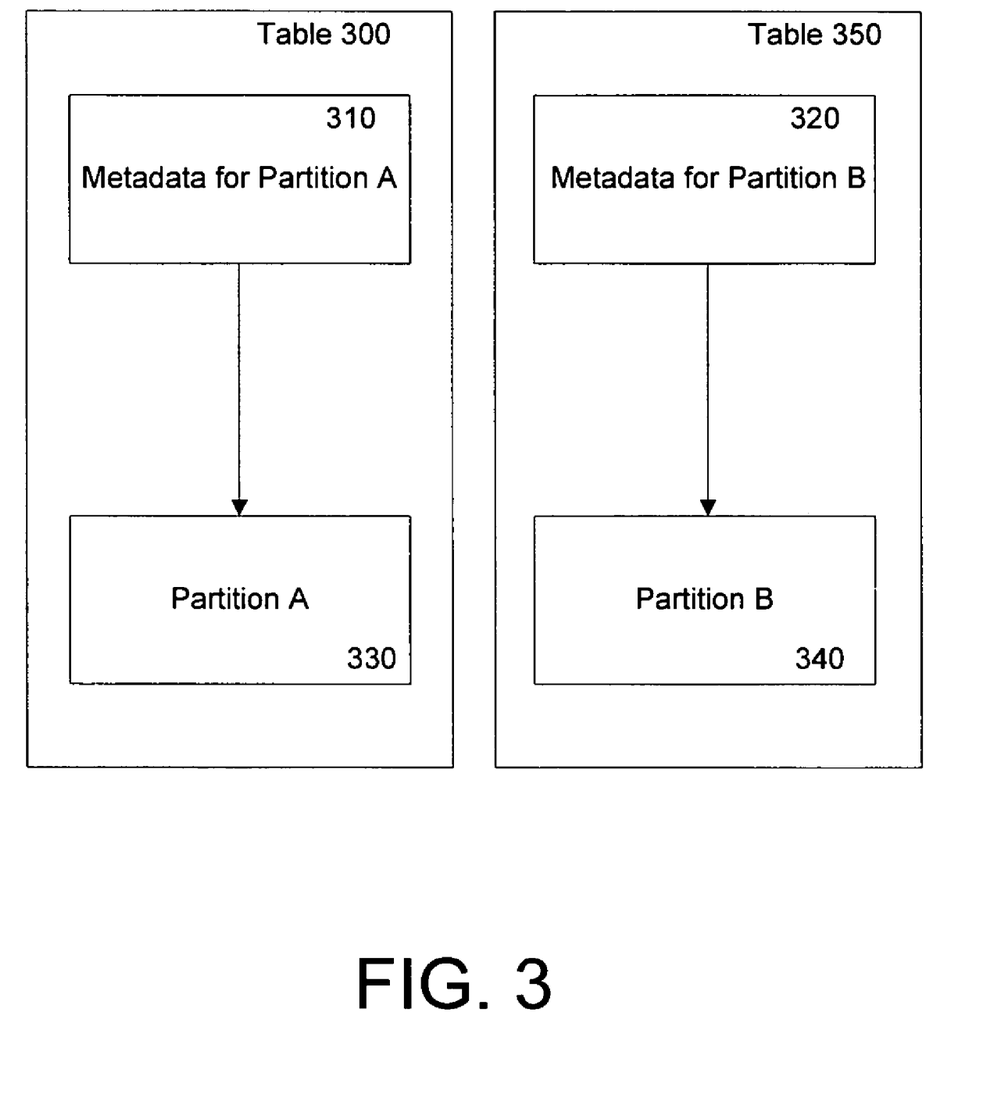
FIG. 3 is a block diagram depicting another metadata aspect of the present invention.

FIG. 3 depicts a table 300 having partition metadata 310 pointing to partition A 330 of the table 300. Another separate table 350 may have partition metadata 320 for Partition B located in table B. If it is desirable, a partition of one table can be mapped into the other table using aspects of the invention.

Figure 4:
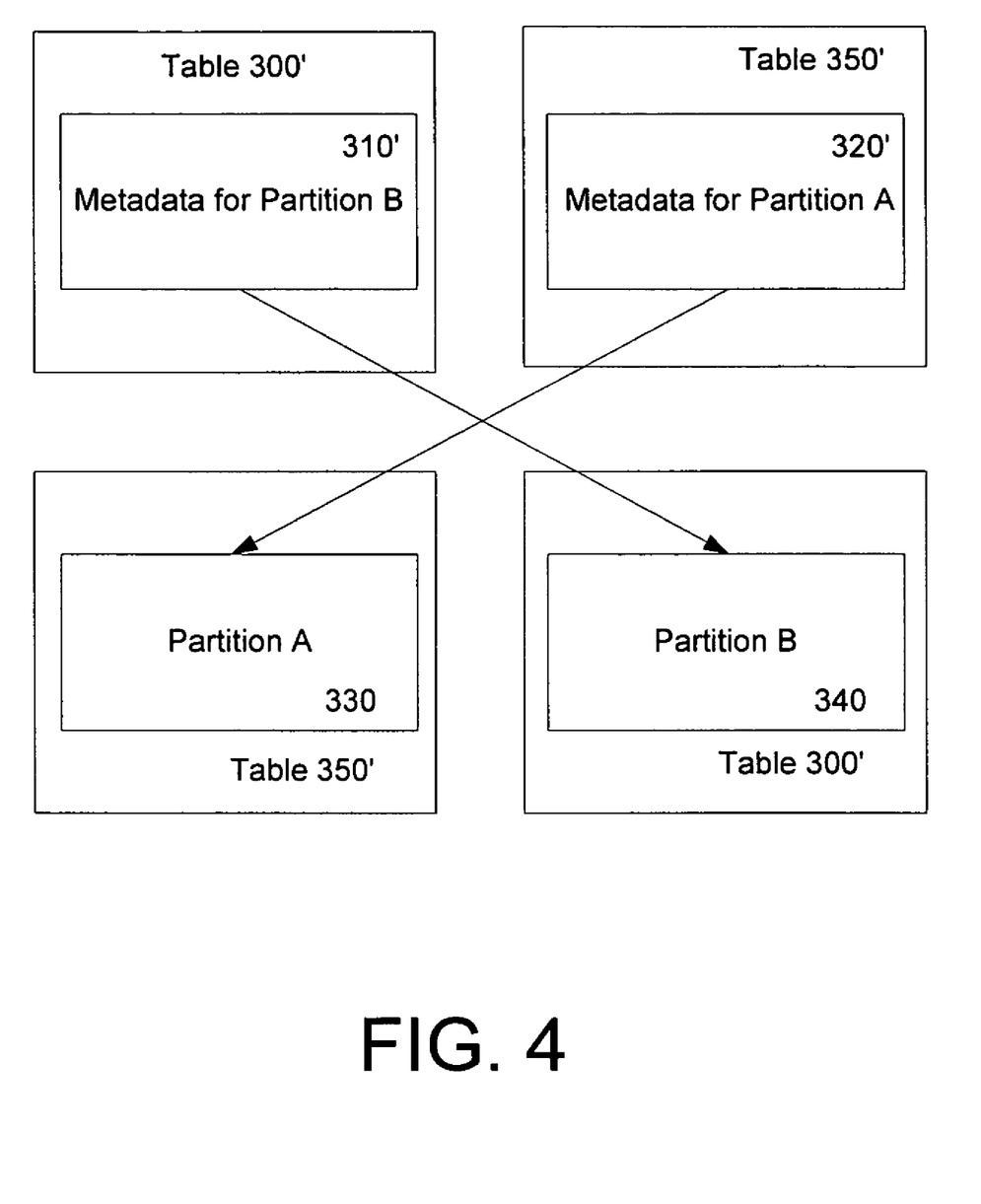
FIG. 4 is a block diagram depicting another switching aspect of the present invention.

FIG. 4 depicts the state of the tables after a switching operation in which partitions are swapped between tables without moving the data of the tables. After the switch, table 300' now contains, among other things, metadata for partition B 310' and partition B 340, previously of table 350. After the switch, table 350' now contains, among other things, metadata for partition A 320' and corresponding access to partition A 330 previously of table 300'. Once again, although the content of the metadata has changed in each table, the data of partition a 330 and partition b 340 has unchanged content and location.

Figure 5:
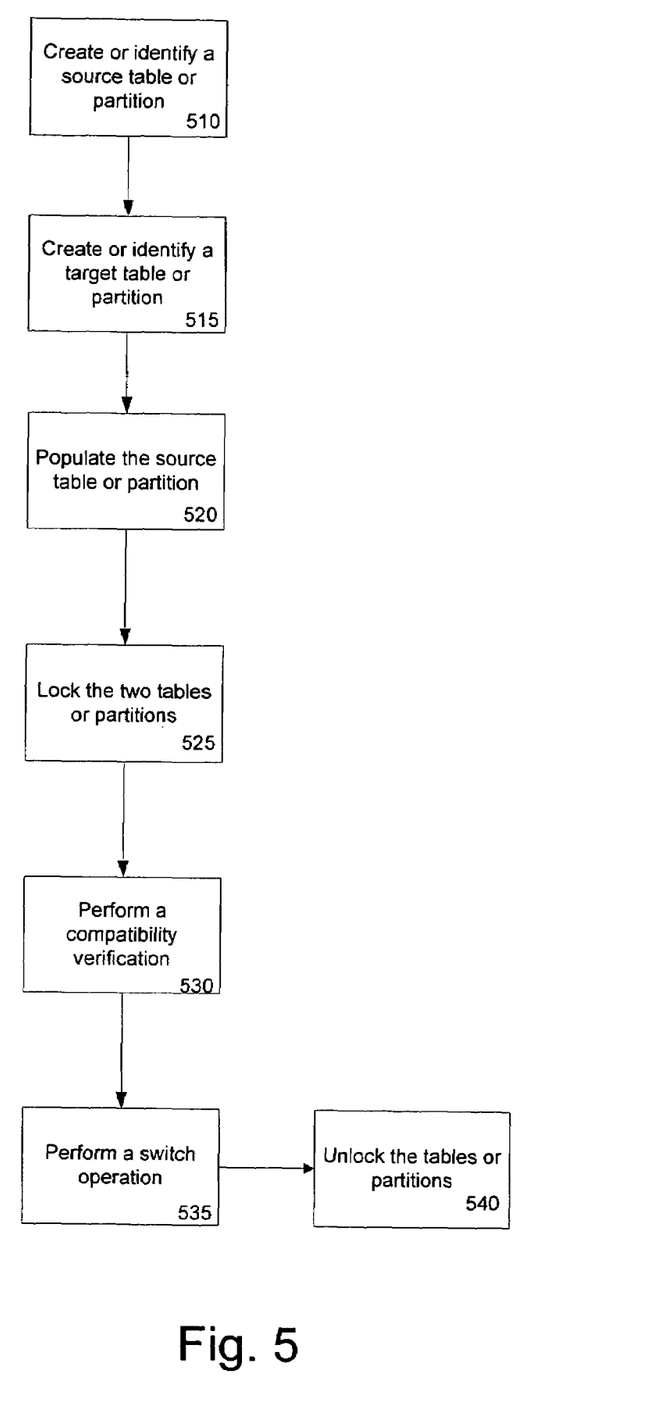
FIG. 5 is an exemplary flow diagram for a method the present invention.

FIG. 5 illustrates a flow diagram of a process of an embodiment of the invention. Initially one may create a new table or identify an existing table (step 510) which will be the source of new information to be entered into the target table. One may also create or identify (step 515) a table partition in the target table which will be swapped with the source. After generation of the source table, the source table may be optionally populated (step 520). Alternately, the table may be left blank. After manipulations of the two tables are completed, the two tables may be locked (step 525). This step ensures the structure and data are not changed while the switch operation is performed. Various implementations may perform this step differently.

A verification of the compatibility of the tables can optionally be performed (step 530). The tables are preferably "compatible" if they have compatible attributes such as the same columns and same indexes. It is noted that the compatibility test can vary among implementation and in some embodiments, can be skipped.

The table metadata is then switched (step 535) according to aspects of the invention where the metadata pointers now bring the source table partition into the table and the target table partition is switched out. The switch operation swivels the pointers pointing to the real data locations so that the contents of the two partitions (or a table and a partition or two tables) is switched. As a final step, the two tables may be optionally unlocked (step 540) to allow access to the tables.

The method of FIG. 5 facilitates the transfer of blocks of data quickly and efficiently. One of skill in the art may readily understand that the invention allows the assigning a table as a partition to an already-existing partitioned table. This implies that the single partition of a non-partitioned table (non-partitioned table only have one partition representing the whole table) can be switched into an already-existing partitioned table. The method of FIG. 5 allows the switching of a partition from one partitioned table to another. Here both tables participating in the switch operation are partitioned and the corresponding partitions of the two tables are switched as a result. The embodiment of the invention of the method of FIG. 5 may reassign a partition to form a single table. This implies that an existing partition of a partitioned table can be switched out to form a non-partitioned table containing a single partition.

A table or partition involved in a switch operation may have one of the two special indexes called either a clustered index or a heap index that contains all the data of the table. The act of switching a particular partition between two tables may be expressed as switching the corresponding partition between all the matching indexes of the table. This is explained in detail as follows.

Since there can be many indexes on Table T1 and also on Table T2, before one can switch the partitions one preferably needs to find an index in Table T1 that matches with index on Table T2. There are some criteria that will match two indexes on two different tables for the switch operation. One criteria is that the list of key columns of the two indexes preferably is the same. This means that the order and the number of key columns is preferably the same and also the type of the key column. Another criteria is that the set operator of non-key columns of the two indexes is preferably the same. This implies that the number and the type of the non-key columns in the two indexes should preferably match. The order of the non-key columns in the two indexes does not matter. Another criteria is that the partition number that needs to be switched between the two indexes preferably resides in the same filegroup.

As an example embodiment of the switch operation, the following function will switch Partition A of Table $T_1$ with Partition B of Table $T_2$:

```
SwitchTablePartition (Table T₁, Partition A, Table T₂, Partition B)
{
while (There are more indexes in Table T₁) // While Loop #1
{
    BOOLEAN FoundMatchingIndex = FALSE;
    Index T₁I₁ 77 GetNextIndexFromTable (T₁)
    while (There are more indexes in Table T₂) // While Loop #2
    {
        Index T₂I₁ ← GetNextIndexFromTable (T₂)
        If ( ListOfKeys (T₁I₁) = ListOfKeys (T₂I₁)
            And SetOfNonKey (T₁I₁) = SetOfNonKey (T₂I₁)
            And FileGroup(T₁I₁) = FileGroup(T₂I₁))
        {
        // We have found the matching index and can switch the corresponding
        //partitions A of index T₁I₁ with partition B of index T₂I₁
        FoundMatchingIndex = TRUE;
        SwitchPartition (T₁I₁, A, T₂I₁, B) // this function is explained later
        Break; // Get out of While Loop #2
        }
        else
        {
        // Keep looping to find the next matching index
        }
    }// While Loop #2
    If (FoundMatchingIndex = FALSE)
    {
    ERROR; // Matching index could not be found.
    BREAK; // Get out of While Loop #1
    }
}// While Loop #1
} // End of SwitchTablePartition function
```

One embodiment which implements the SwitchPartition function that switches the partition A of an index I1 of table T1 with partition B of index I2 of another table T2 can preferably have metadata which may be changed. Some metadata changes can be physical properties like ROWLOCK, PAGELOCK, PADINDEX, FILLFACTOR of the partition to be switched, the owner of partition to be switched and the physical pointer to actual location of data contained in the partition to be switched.

In one embodiment, the metadata switch operation can be performed by copying the metadata information of partition A as explained above to a temporary storage place, copying the metadata information of partition B to Partition A, and then copying the metadata information of partition A from the temporary storage location to partition B.

In another embodiment, the following function will switch partition A of index $I_1$ with partition B of index $I_2$

```
SwitchPartition (Index I₁, Partition A, Index I₂, Partition B)
{
    // Copy the metadata of index I₁ at a temporary location to be
    used later.
    // Get the physical properties of Index I₁ like ROWLOCK,
    PAGELOCK, //PADINDEX,
    FILLFACTOR and store them in a temporary location.
    TempProperties = PhyisicalProperties(I₁, A)
    // Get the Owner of Index I₁ and store it in a temporary location.
    TempOwner = PhyisicalProperties(I₁, A)
    // Get the actual address of Index I₁ and store it in a temporary
    location.
    TempAddress = PartitionAddress (I₁, A)
    // Now copy the metadata of index I₂ to index I₁. After this operation
    Partition B of//index I₂
    will behave as if it is part of Index I₁.
    PhyisicalProperties (I₁, A) = PhyisicalProperties(I₂, B)
    PartitionOwner (I₁, A) = PartitionOwner (I₂, B)
    PartitionAddress (I₁, A) = PartitionAddress (I₂, B)
    //Now copy the metadata of index I₁ to index I₂. Note that the original
    metadata of//index I₁
    was stored in a temporary location in the first step. After this
    operation //Partition A index I₁
    will behave as if it is part of Index I₂.
    PhyisicalProperties (I₂, B) = TempProperties
    PartitionOwner (I₂, B) = TempOwner
    PartitionAddess (I₂, B) = TempAddess
}
```

One embodiment of the present invention involves an extension of ALTER TABLE statement will switch a single partition of an existing table, or whole non-partitioned table, to a single partition of existing partitioned or non-partitioned table. According to an aspect of the invention, the ALTER TABLE SWITCH PARTITION supports both partitioned and non-partitioned tables. In one embodiment, execution of this statement does not involve any data movement; it is purely a metadata operation. However, in another embodiment, a combination of metadata movement and table data movement is foreseeable and thus are considered to fall within the scope of this invention. This gives an efficient alternative to inserting or deleting data in partitioned tables. The extension is shown below and syntactically is an alternative for the rest of the ALTER TABLE statement.

```
ALTER TABLE [database_name.[ owner1 ] . | owner1.] table_name1
SWITCH
[PARTITION <partition_number1>] TO [database_name.[owner2 ] .
| owner2. ]
table_name2 [PARTITION <partition_number2>]
If table_name1 is partitioned, then the <partition_number1> may be
specified.
If table_name1 is not partitioned, then the <partition_number1>
is ignored and it may not need
```

-continued

```
to be specified.
Similarly for table_name2, and <partition_number2>.
<partition_number1> and <partition_number2> are integer (tinyint,
smallint, bigint or int)
constant expressions. A constant expression is an expression that
references constants, variables (including UDTs), UDFs, built-in
functions, but no SQL expression. Typical examples of
constant expressions in this context are constants and $partition.
<partition_function_name>
(<argument>[, . . . n]).
```

According to aspects of the present invention, two possible scenarios targeted by the ALTER TABLE SWITCH PARTITION extension are the loading of new data into a table and switch out data from a table. In the first scenario, a non-partitioned table can be created that can hold data eventually designated for the new partition. This new table may be populated along with corresponding indexes. One may then declare this table a partition of an existing partitioned table by switching it into the partitioned table. As a result of the switch operation, all data originally loaded into the non-partitioned table will appear in the partitioned table, and the non-partitioned table will be "empty". In a second scenario, a non-partitioned table may be created that will eventually hold all data of one partition of an existing partitioned table. One can perform a switch operation from the partitioned table. All data originally residing in the switched partition of the partitioned table will now show up in the non-partitioned table, and the source partition of the partitioned table will now empty.

One of skill in the art can observe that the two above described scenarios may be combined to perform special "per partition" operations. For example, the scenarios may be used to re-index a partition. A general scheme to perform such operations is to switch a partition out, perform the desired operation on the table that holds the partition, and switch the partition back in.

As stated above, in one embodiment of the invention, no data is manipulated or touched. That is, there is no scan, rebuild index, verify by scanning data, or similar manipulation performed during the switch operation. The target partition may be empty. Both tables may be pre-defined and may exist, and a check on metadata may be performed. Other embodiments where data can be moved, changed, deleted or otherwise acted upon as a result of the switch are optional but are still within the scope of the invention.

Exemplary Computing Device

Figure 6:
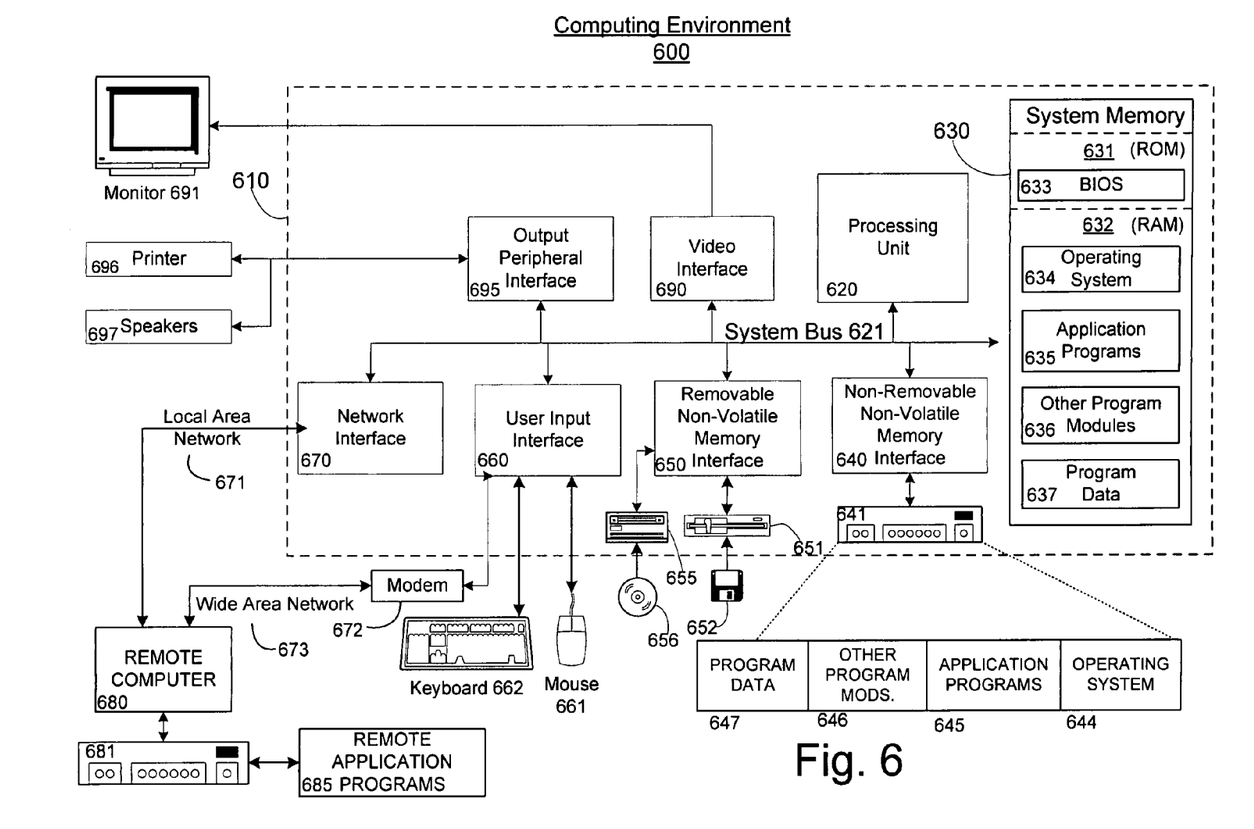
FIG. 6 is a block diagram showing an exemplary computing environment in which aspects of the invention may be implemented.

FIG. 6 and the following discussion are intended to provide a brief general description of a suitable computing environment in which embodiments of the invention may be implemented. It should be understood, however, that handheld, portable and other computing devices and computing objects of all kinds are contemplated for use in connection with embodiments of the invention. Thus, while a general purpose computer is described below, this is but one example, and embodiments of the invention may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 6 thus illustrates an example of a suitable computing system environment 600 in which the embodiments of the invention may be implemented, although as made clear above, the computing system environment 600 is only one example of a suitable computing environment and is not intended to suggest any limitation as to the scope of use or functionality of an embodiment of the invention. Neither should the computing environment 600 be interpreted as having any dependency or requirement relating to any one or combination of components illustrated in the exemplary operating environment 600.

With reference to FIG. 6, an exemplary system for implementing an embodiment of the invention includes a general purpose computing device in the form of a computer system 610. Components of computer system 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PC1) bus (also known as Mezzanine bus).

Computer system 610 typically includes a variety of computer readable media. Computer readable media can be any available media that can be accessed by computer system 610 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer system 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer system 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6 provide storage of computer readable instructions, data structures, program modules and other data for the computer system 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer system 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus 621, but may be connected by other interface and bus structures, such as a parallel port, game port or a universal serial bus (USB). A monitor 691 or other type of display device is also connected to the system bus 621 via an interface, such as a video interface 690, which may in turn communicate with video memory (not shown). In addition to monitor 691, computer systems may also include other peripheral output devices such as speakers 697 and printer 696, which may be connected through an output peripheral interface 695.

The computer system 610 may operate in a networked or distributed environment using logical connections to one or more remote computers, such as a remote computer 680. The remote computer 680 may be a personal computer, a server, a router, a network PC, a peer device or other common network node, and typically includes many or all of the elements described above relative to the computer system 610, although only a memory storage device 681 has been illustrated in FIG. 6. The logical connections depicted in FIG. 6 include a local area network (LAN) 671 and a wide area network (WAN) 673, but may also include other networks/buses. Such networking environments are commonplace in homes, offices, enterprise-wide computer networks, intranets and the Internet.

When used in a LAN networking environment, the computer system 610 is connected to the LAN 671 through a network interface or adapter 670. When used in a WAN networking environment, the computer system 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer system 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a database partition switching scheme. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs of an embodiment of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of an embodiment of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the discussed embodiments of the invention. Additionally, any storage techniques used in connection with an embodiment may invariably be a combination of hardware and software.

While aspects of the present invention has been described in connection with the preferred embodiments of the various figures, it is to be understood that other similar embodiments may be used or modifications and additions may be made to the described embodiment for performing the same function of the present invention without deviating therefrom. Further-more, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A processor-implemented method of making changes to a first portion of a database table while retaining access to a second portion of the database, the method comprising:

separating, via the processor, the first portion of the database table from the database table, wherein the separated first portion is accessed off-line from the database table, wherein the first portion of the database table has a first set of metadata pointers and a portion outside of the database table has a second set of metadata pointers, wherein the separating is performed by switching metadata pointers of the first set and the second set;

making changes to the separated first portion to generate a changed first portion;

switching the changed first portion back into the database table by switching the metadata pointers of the first set with the second set, wherein the changed first portion is mapped back into the database table, wherein no data is moved as the changed first portion is rejoined with the database table, and wherein the second portion of the database table remained accessible to users during a time when the separated first portion was off-line, the metadata pointers of the first set being set forth in a first index associated with the database table, the metadata pointers of the second set being set forth in a second index associated with a switching table, the separating as performed by switching metadata pointers of the first set and the second set comprising identifying the second index associated with the switching table from among a plurality of indexes already associated with the switching table and switching the first index and the identified second index without modifying the identified second index, the identifying of the second index from among the plurality of indexes comprising finding an index from among the plurality of indexes, the found list having a list of key columns identical to a list of key columns of the first index such that an order and number of key columns matches, the found list also having a set operator of non-key columns identical to a set operator of non-key columns of the first index such that a number and type of the non-key columns matches.

2. A computer-readable storage medium having computer-executable instructions for performing a method of changing a portion of a table, the method comprising:

separating a portion of a first table from the first table by switching metadata pointers of the portion of the first table with metadata pointers of a portion in a second table, wherein the separated portion is considered off line and therefore not accessible through the first table when the separated portion is part of the second table;

making changes to the separated portion to generate a changed portion;

switching the changed portion back into the first table by switching metadata pointers of the portion of the first table with metadata pointers of the portion of the second table, wherein the changed portion is mapped back into the first table and wherein no data is moved as the changed portion is rejoined with the first table, the metadata pointers of the first set being set forth in a first index associated with the database table, the metadata pointers of the second set being set forth in a second index associated with a switching table, the separating as performed by switching metadata pointers of the first set and the second set comprising identifying the second index associated with the switching table from among a plurality of indexes already associated with the switching table and switching the first index and the identified second index without modifying the identified second index, the identifying of the second index from among the plurality of indexes comprising finding an index from among the plurality of indexes, the found list having a list of key columns identical to a list of key columns of the first index such that an order and number of key columns matches, the found list also having a set operator of non-key columns identical to a set operator of non-key columns of the first index such that a number and type of the non-key columns matches.

3. A system for making changes to a first portion of a database table while retaining access to a second portion of the database table, the system comprising:

a processor having access to memory, the memory having instructions of software components;

a storage system having the first portion of a database and the second portion of the database;

a software component having instructions which, when executed by the processor, separates the first portion of the database table from the database table, wherein the separated first portion is accessed off-line from the database table, wherein the first portion of the database table has a first set of metadata pointers and a portion outside of the database table has a second set of metadata pointers, wherein the separation is performed by switching metadata pointers of the first and second set;

wherein the software component is accessed by a user to make changes to the separated first portion to generate a changed first portion and thereafter switches the changed first portion back into the database table by switching the metadata pointers of the first and second set, wherein the changed first portion is mapped back into the database table, wherein no data is moved as the changed first portion is rejoined with the database table, and wherein the second portion of the database table remained accessible to users during a time when the separated first portion was off-line, the metadata pointers of the first set being set forth in a first index associated with the database table, the metadata pointers of the second set being set forth in a second index associated with a switching table, the separating as performed by switching metadata pointers of the first set and the second set comprising identifying the second index associated with the switching table from among a plurality of indexes already associated with the switching table and switching the first index and the identified second index without modifying the identified second index, the identifying of the second index from among the plurality of indexes comprising finding an index from among the plurality of indexes, the found list having a list of key columns identical to a list of key columns of the first index such that an order and number of key columns matches, the found list also having a set operator of non-key columns identical to a set operator of non-key columns of the first index such that a number and type of the non-key columns matches.

4. A processor-implemented method of simultaneously archiving a first portion of a database and adding a new third portion of a database, while retaining access to a second portion of the database, the method comprising:
- granting, via the processor, users access to a first portion and a second portion of a database, wherein the first portion of the database has a first set of metadata pointers, wherein the second portion of the database has a second set of metadata pointers;
- generating the new third portion, wherein the new third portion of the database has a third set of metadata pointers;
- locking user access to the first portion while maintaining user access to the second portion of the database;
- switching the new third portion into the database and simultaneously switching out the first portion by switching the metadata pointers of the first set with the third set, wherein no data is moved as the new third table is mapped into the database and the first portion is mapped out of the database, and wherein the second portion of the database remained accessible to the users and the new third portion of the database is now also accessible to the users, the metadata pointers of the first set being set forth in a first index associated with the database table, the metadata pointers of the second set being set forth in a second index associated with a switching table, the separating as performed by switching metadata pointers of the first set and the second set comprising identifying the second index associated with the switching table from among a plurality of indexes already associated with the switching table and switching the first index and the identified second index without modifying the identified second index, the identifying of the second index from among the plurality of indexes comprising finding an index from among the plurality of indexes the found list having a list of key columns identical to a list of key columns of the first index such that an order and number of key columns matches, the found list also having a set operator of non-key columns identical to a set operator of non-key columns of the first index such that a number and type of the non-key columns matches.

* * * * *

UNITED STATES PATENT AND TRADEMARK OFFICE
CERTIFICATE OF CORRECTION

PATENT NO. : 7,624,120 B2
APPLICATION NO. : 10/880271
DATED : November 24, 2009
INVENTOR(S) : Deepak Pawar et al.

Page 1 of 1

It is certified that error appears in the above-identified patent and that said Letters Patent is hereby corrected as shown below:

In column 13, lines 57-58, in Claim 2, delete "off line" and insert -- off-line --, therefor.

In column 16, line 13, in Claim 4, after "indexes" insert -- , --.

Signed and Sealed this
Tenth Day of May, 2011

David J. Kappos
*Director of the United States Patent and Trademark Office*